Patented May 19, 1925.

1,538,419

UNITED STATES PATENT OFFICE.

KARL WILKE AND JOSEF STOCK, OF HOCHST-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

VAT DYESTUFF AND PROCESS OF MAKING SAME.

No Drawing.   Application filed April 16, 1924.   Serial No. 706,988.

*To all whom it may concern:*

Be it known that we, KARL WILKE and JOSEF STOCK, citizens of Germany, residing at Hochst-on-the-Main, Germany, have invented certain new and useful Improvements in Vat Dyestuffs and Processes of Making Same, of which the following is a specification.

We have made the observation that the nitrogen-containing derivatives of dibenzanthronyls and dibenzanthrones which are produced by the action of nitrating means upon dibenzanthronyls and also upon dibenzanthrones, yield by a fusion with caustic potash vat-dyestuffs specially interesting by virtue of their shade.

Dibenzanthronyl and dibenzanthrone have most probably the following formulæ—

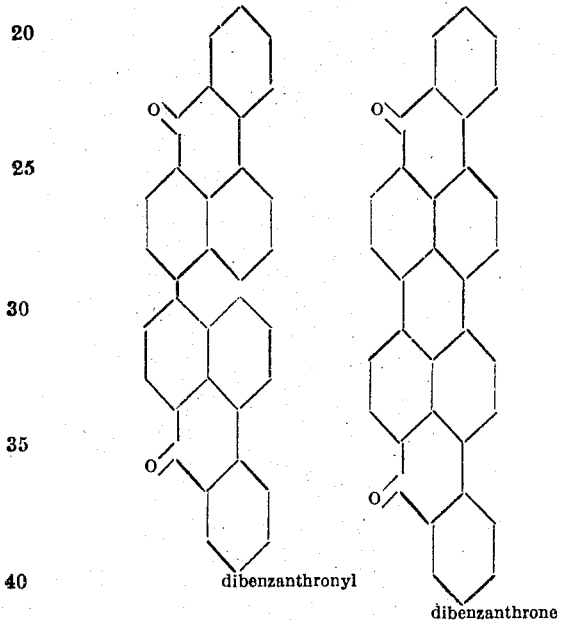

dibenzanthronyl   dibenzanthrone (See German Patent No. 407,838) (See German Patent No. 290,079).

Examples.

1. 40 parts of nitro-2.2-dibenzanthronyl are stirred at 160–180° into a molten mixture of 400 parts of caustic potash and 200 parts of alcohol and the temperature of the fusion is slowly raised to 225–230°. The stirring being continued for some time at the same temperature, the fusion is dissolved in water, blown out with air for the purpose of oxidation of leuco compound formed, acidified with hydrochloric acid, filtered and the solid mass is washed. The dyestuff thus obtained forms a black paste. From the dark, claret-read alkaline hydrosulphite vat cotton is dyed greyish-blue to black shades.

2. 15 parts of mononitrodibenzanthrone are entered at 160° into a mixture of 150 parts of caustic potash and 75 parts of alcohol, the fusion is stirred for a short time at 180°, then heating is continued to 225–230°. After about ½ an hour the mass is cooled, dissolved in water, air being introduced for the purpose of oxidation of the leuco compound, then filtered and washed. The dyestuff is obtained in the form of a paste of a bluish-black color dyeing cotton from a violet alkaline hydrosulphite vat greyish-blue to black tints of very good fastness properties.

3. A similar product is obtained if dinitrodibenzanthrone—obtainable by nitration of dibenzanthrone with concentrated nitric acid in nitrobenzene and forming a bluish-green powder, soluble in concentrated sulphuric acid with a brownish-violet color and with a content of nitrogen of 5.16%,— is subjected to a fusion with alkali and worked up in the same way as indicated in Example 2).

Having now described our invention, what we claim is:

1. A process for the preparation of vat-dyestuffs which consists in treating the nitrogen-containing bodies, obtainable by the action of nitrating agents upon such products as are formed by condensing 2 molecules of benzanthrone, with alkaline condensation means.

2. A process for the preparation of a vat dyestuff, which consists in nitrating 2.2-dibenzanthronyl and melting the product so obtained with caustic alkali.

3. As new products the dyestuffs which may be obtained by treating the bodies produced by the action of nitrating means upon such products as are obtained by condensing 2 molecules of benzanthrone, with alkaline condensation means, which products form when dry, dark colored powders dissolving in concentrated sulphuric acid with a characteristic coloration and dyeing cotton from green to grey and black shades of very good fastness properties.

4. As a new product, the vat dyestuff obtainable by melting nitrated 2.2-dibenzanthronyl with caustic alkali, being a black powder, soluble in concentrated sulfuric acid with a violet color, giving a claret-red vat with alkali hydrosulfite from which cotton is dyed greyish-blue to black shades.

In testimony whereof, we affix our signatures.

KARL WILKE.
JOSEF STOCK.

Witnesses:
HILDE SCHIEBERT,
PAUL K. HILLMANN.